Patented May 14, 1935

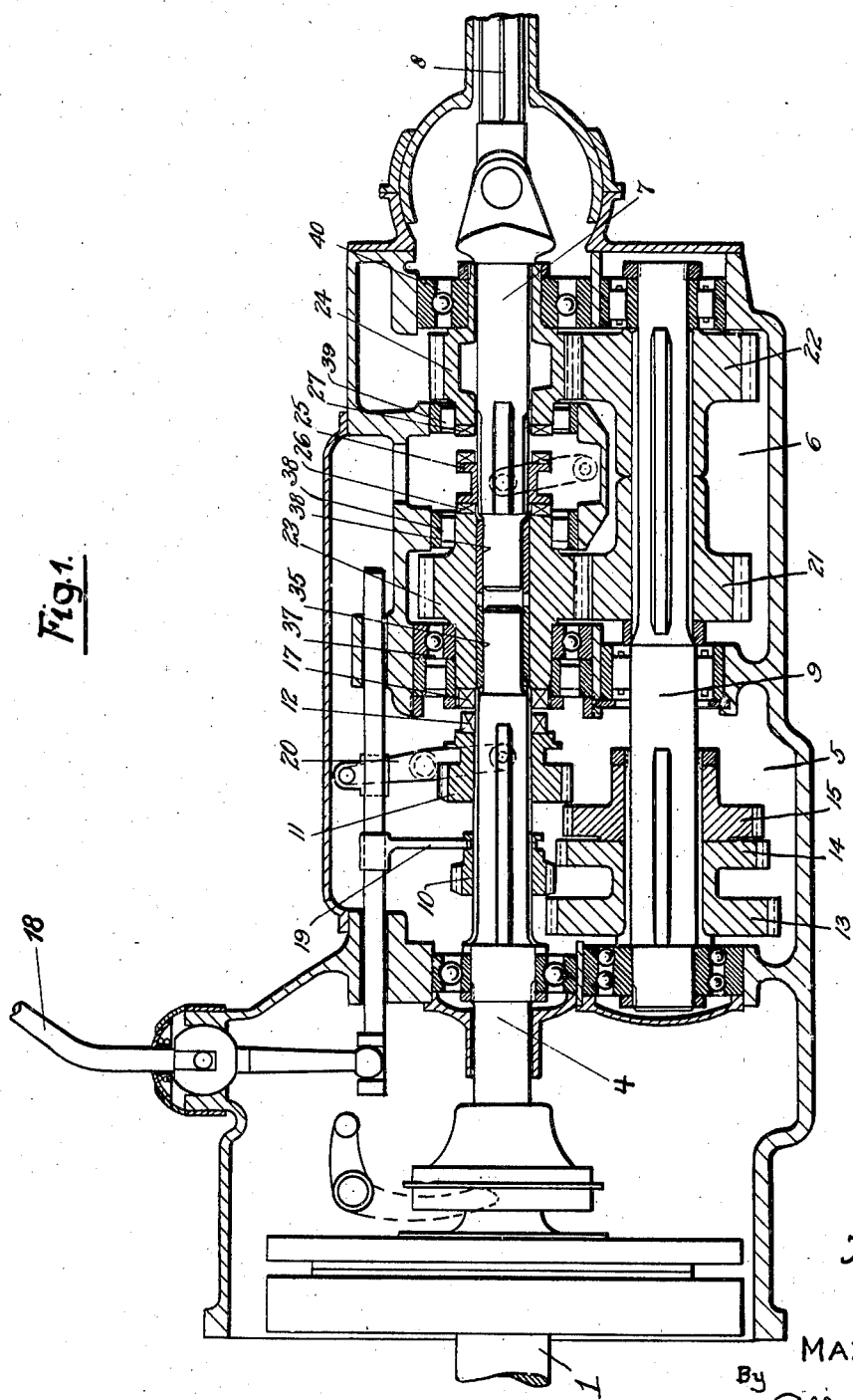

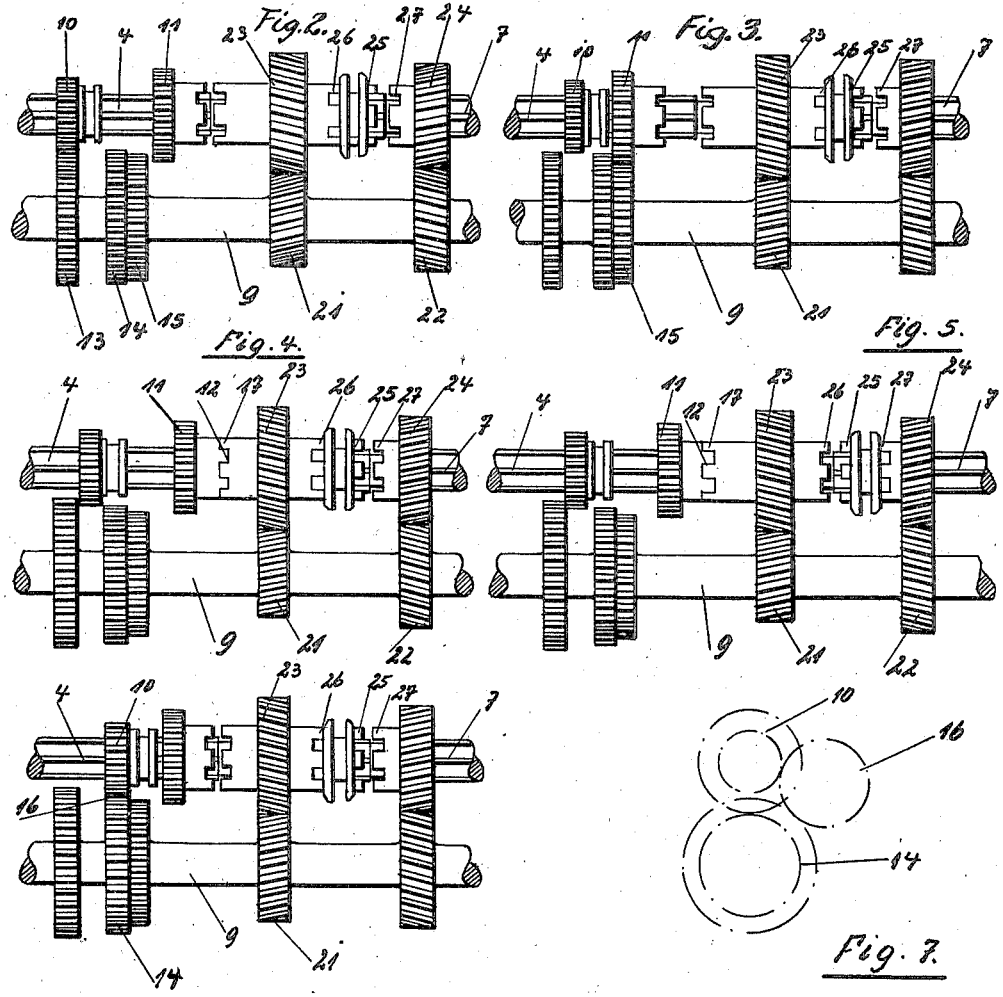
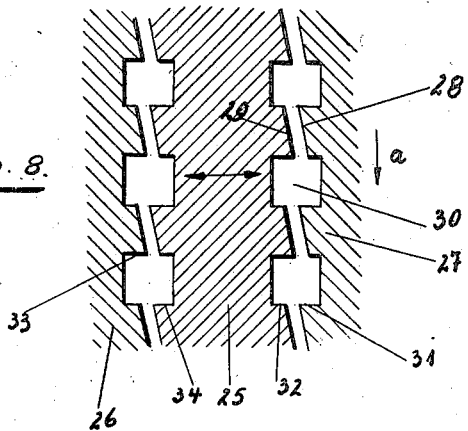

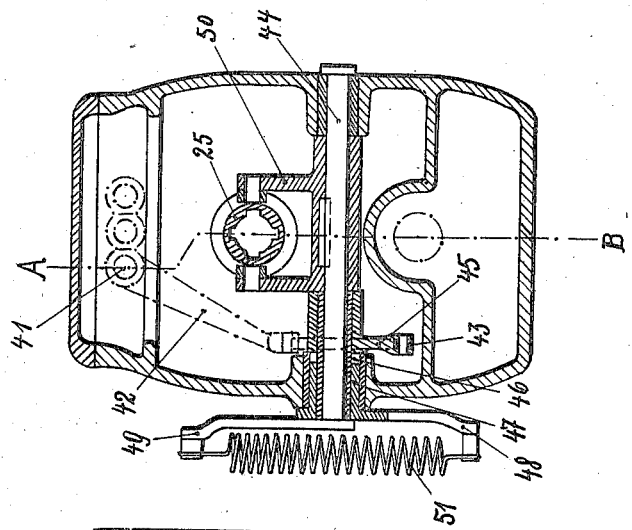
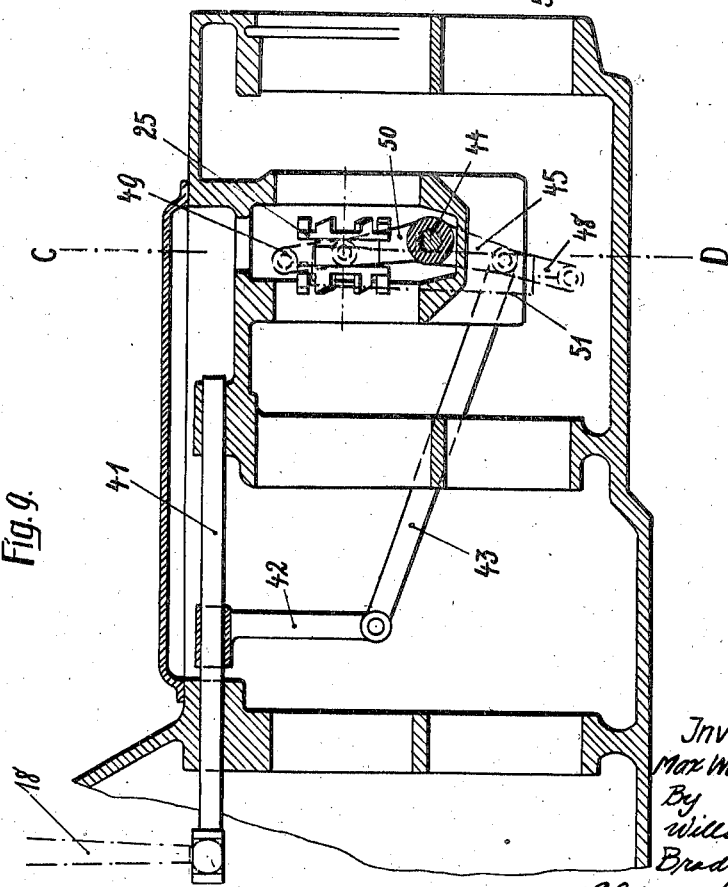

2,001,082

UNITED STATES PATENT OFFICE 2,001,082

CHANGE SPEED GEAR MECHANISM FOR MOTOR VEHICLES

Max Wagner, Stuttgart, Germany, assignor to Daimler-Benz Aktiengesellschaft, Stuttgart-Unterturkheim, Germany, a company of Germany Application June 12, 1931, Serial No. 543,877
In Germany June 13, 1930

1 Claim. (Cl. 74—333)

The invention refers to a change speed gear mechanism for motor vehicles.

The mechanism according to the invention consists of a group of gears which can be thrown out of mesh for instance by shifting, and of a group comprising pairs of constantly meshed gears, said last mentioned gears being rendered operative by means of an alternative coupling device without a neutral position.

According to the invetnion and with regard to the direction in which the torque is transmitted by the mechanism the last mentioned group of gears is arranged following the first mentioned group.

This arrangement enables an easy engagement of the different gears.

In consequence of the fact, that the alternative coupling device is made inoperative only for the moment while the alternation of the coupling is effected and that under normal conditions said coupling device cannot occupy a neutral position, the main part of the mechanism is always coupled with the driven shaft and consequently with the rotating car wheels at the moment when the shiftable gears are caused to mesh by shifting them into operative position.

Consequently the rotating speed of the parts of the transmission mechanism cannot be slackened materially under the resisting influence of the tough lubricant, a circumstance, which otherwise would occur especially when the car has just been started, and which would result in difficult shifting of the gears.

For each group of gears a remarkably smooth and noiseless engagement is obtained in consequence of the fact, that the alternative coupling device can be operated without the necessity of uncoupling the motor from the driving mechanism and from the propeller shaft, and that after the control lever has been shifted the operation of the coupling device is effected automatically.

In the drawings a form of embodiment of the change speed gear mechanism according to this invention is illustrated.

Fig. 1 is a longitudinal section through the mechanism.

Figs. 2–7 show the different positions of the parts of the mechanism, in accordance with the different gears engaged.

Fig. 8 shows the beveled coupling teeth of the coupling device of the mechanism.

Figs. 9 and 10 are a longitudinal section and a cross-section respectively of the shifting mechanism for the shiftable coupling clutch with some parts omitted and drawn to an enlarged scale.

The driving shaft 4 of the change speed gear mechanism is driven by the motor shaft 1.

The mechanism is mounted in a housing, comprising two chambers 5 and 6. In the chamber 5 are mounted the gears for the first, second and third gear and for the reverse gear. In the chamber 6 is mounted the super-speed gear mechanism, which is constructed as a double gear mechanism.

Between the driving shaft 4 and the driven shaft 7, which in its turn drives the propeller shaft 8, is mounted the gear 23 which is provided with a hollow hub and which serves as intermediate shaft between the shafts 4 and 7. The driving shaft 4 and the driven shaft 7 are journaled in the gear 23 by means of journals 35 and 36.

As a result of the construction of the double gear mechanism according to the invention the journals 37, 38 and 39, 40 can be arranged close to the sides of the gear wheels. In this way the possibility of bending the shaft is prevented and noiseless operation of the gears is obtained.

On the driving shaft 4 are mounted the gear wheels 10 and 11. The gear wheel 11 is provided with coupling teeth 12 for meshing with the coupling teeth 17 of the gear 23.

On the counter shaft 9 are mounted the gear wheels 13 and 15 for the first and second gear, together with the gear wheel 14 for the reverse. Said gear wheels are rigid on the counter shaft and cannot be shifted.

On the counter shaft 9 are mounted two separate gear wheels 21 and 22, which are constantly meshed with the gear wheels 23 and 24 for instance by means of the usual spur gear teeth.

By means of the coupling device 25, which is provided with beveled coupling teeth and which can alternately engage the gear wheels 23 or 24 by means of the coupling teeth 26 and 27, said gear wheels 23 and 24 can alternately be coupled with said shiftable clutch 25 and consequently with the driven shaft 7.

The operation of the clutch 25 can for instance be effected by means of a third shifting rod or by means of a special lever in such a way that after the clutch has passed its neutral position, it is automatically shifted into the end position for instance under the influence of springs.

In the form of embodiment illustrated in the drawing the forward gears and the reverse gear are shifted by means of the control handle 18 and by the shifting fork 19, while the second speed gear and the direct drive are operated by means of the double armed lever 20.

In the different positions illustrated in the Figs. 2–7 the torque of the motor shaft 1 is transmitted in the following manner.

Fig. 2 shows the transmission for first gear. The gear wheels 10 and 13 are meshed as well as the gear wheels 21 and 23. The coupling teeth of the clutch 25 are engaged with the coupling teeth 26 of the gear wheel 23.

Fig. 3 shows the transmission for second gear. The gear wheels 11, 15, 21 and 23 are meshed. The coupling teeth of the clutch 25 are engaged with the coupling teeth 26 of the gear wheel 23.

Fig. 4 shows the transmission for the third gear or direct drive. The coupling teeth of gear wheel 11 engaged with the coupling teeth 17 of the gear 23. The coupling teeth of the clutch 25 are engaged with the coupling teeth 26 of the gear wheel 23.

Figs. 6 and 7 show the transmission for the reverse motion. The gear wheels 10, 16 and 14 as well as 21 and 23 are engaged. The coupling teeth of the clutch 25 are engaged with the coupling teeth 26 of gear wheel 23.

In all the above mentioned cases the coupling teeth of the clutch 25 engage the coupling teeth 26 of the gear wheel 23. Consequently the driven shaft 7 is coupled with the countershaft 9 and with the gears rigidly mounted thereon.

When changing gears, for instance when changing from first to second gear, the gear wheel 10 is shifted out of engagement with gear wheel 13 after the motor clutch has been thrown out. During the course of changing gears only the gear wheels 10 and 11 rotate together with the driving shaft 4, while the countershaft 9 and the gear wheels rigidly mounted thereon rotate with the driven shaft 7. Slackening of the rotation of the driving shaft in consequence of the braking influence of the tough lubricant is consequently less with the mechanism according to this invention than is the case with known change speed gear mechanisms in which the countershaft rotates together with the driving shaft. The shifting of the gears is consequently rendered easier.

In Fig. 5 is illustrated the position of the different gear wheels for the super-speed transmission. The super-speed transmission is effected from the direct-drive position (Fig. 4) by shifting the clutch 25 to the right which causes gear wheel 23 to be uncoupled from the driven shaft 7 and gear wheel 24 to be coupled with it.

The torque is in that case transmitted from the shaft 4 by means of the coupling teeth 12, 17, gear wheels 23, 21 and gear wheels 22, 24 and the clutch 25, to the driven shaft 7.

In Fig. 8 is shown the clutch 25 with the coupling teeth arranged on it.

For the direct drive the coupling teeth 26 of the intermediate gear wheel 23 engage those of the clutch 25. Coupling teeth 27 run idle and show in the direction *a* an acceleration with regard to teeth 26, the degree of acceleration depending on the transmission ratio.

When changing from direct drive to super-speed, the control handle of the clutch is shifted and the fuel admission to the motor is throttled down, next a spring, which has been put under tension during the course of shifting the clutch control handle disengages the clutch from the coupling teeth 26 of the intermediate gear wheel 23, and pushes said clutch in the direction of the coupling teeth 27 of the gear wheel 24 in such a way, that it is impossible for said clutch to occupy an intermediate neutral position.

The clutch can engage the coupling teeth 27 as soon as the circumferential speed of both parts is nearly equal. In this position the clutch 25 is driven by means of the coupling teeth 27, the short sides 31 and 32 of the coupling teeth transmitting the driving force.

Changing back from super-speed to direct drive is effected by reversing this process. In that case the driving force is transmitted by means of the long sides 33 and 34 of the coupling teeth, the circumferential force being in that case greater than in the former case.

Consequently the specific surface pressure is in both cases nearly the same.

In Figs. 9 and 10 the shifting mechanism for the shiftable coupling clutch mounted in the housing of the change speed gear mechanism is illustrated. The other parts of the mechanism, such as shafts and gear wheels, are omitted for the sake of clarity.

For the operation of the shifting mechanism the same shifting rod 18 may be used as for the operation of the shiftable gear wheels. However, a separate shifting rod or a pneumatic device may be used in its place. As shown in Fig. 9 the shifting rod 18 operates a shaft 41, to which the arm 42 is secured. With the end of said arm 42 a rod 43 is pivotally connected, the other end of which operates a lever 45, which can freely rotate on the shaft 44. By means of coupling teeth 46 said lever 45 is connected with the hub 47 and consequently also with the arm 48.

To the shaft 44 are secured the arm 49 and the fork 50; by means of the latter the clutch 25 can be shifted.

Between the ends of the arms 48 and 49 the spring 51 is arranged, which spring tends to continually diminish the distance between the ends of the arms 48 and 49. When the shaft 41 is shifted to the right (Fig. 9), the lever 45 and, together with said lever, the arm 48, leave the position illustrated in Fig. 9 and are swung to the right, with the aid of the rod 43. In consequence the arms 48 and 49 are brought into a position in which these two arms are diametrically opposed and the spring 51 is expanded. When the lever 45 proceeds on its way to the right, the diametrical opposition of the arms 48 and 49 does no longer exist and the spring 51 tends to contract, thereby swinging the lever arm 49 to the right. This will occur as soon as the moment of the torque applied to the coupling teeth of the coupling clutch 25 decreases and thereby said coupling teeth are released, in consequence of which the arm 49 and together with it the coupling clutch 25 will be forced into the other extreme end position.

What I claim is:

Change speed gear mechanism for motor vehicles comprising, in combination, a set of shiftable gears mounted on the driving shaft directly at the rear of the engine of the vehicle, adapted to be engaged with and disengaged from a set of conventional forward speed and reverse gears mounted on a counter-shaft below said drive shaft, a rearward extension on said counter-shaft beyond the rear end of said driving shaft, a driven shaft mounted rearward of and in alinement with said driving shaft, an intermediate gear receiving within its hub the adjacent ends of both said driving and driven shafts, a gear in constant mesh with said intermediate gear rigidly mounted therebelow on said rearward extension of the counter-shaft, another gear rigidly mounted on said counter-shaft-extension rearwardly of said before mentioned gear in constant mesh with a gear loosely mounted on said driven shaft, rearwardly of said intermediate gear, means for selectively engaging said intermediate gear with said driving shaft to rotate therewith, and means for alternatively engaging said intermediate gear, the gear mounted rearwardly thereof on the driven shaft, to rotate with the latter, and automatic means for forcibly engaging one of the two last mentioned gears with said driven shaft to rotate therewith at all times when the other of said gears is not engaged therewith.

MAX WAGNER.